Oct. 14, 1969  R. E. BROWN ET AL  3,472,002
SELF-CLEANING DRUM TYPE FILTER ASSEMBLY
Filed Feb. 9, 1967  4 Sheets-Sheet 3
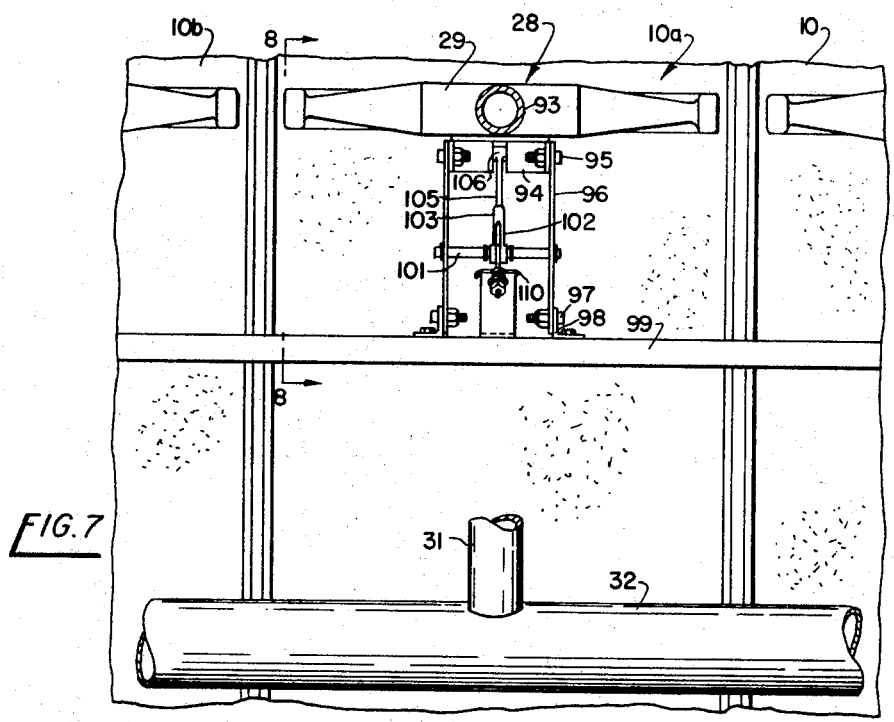
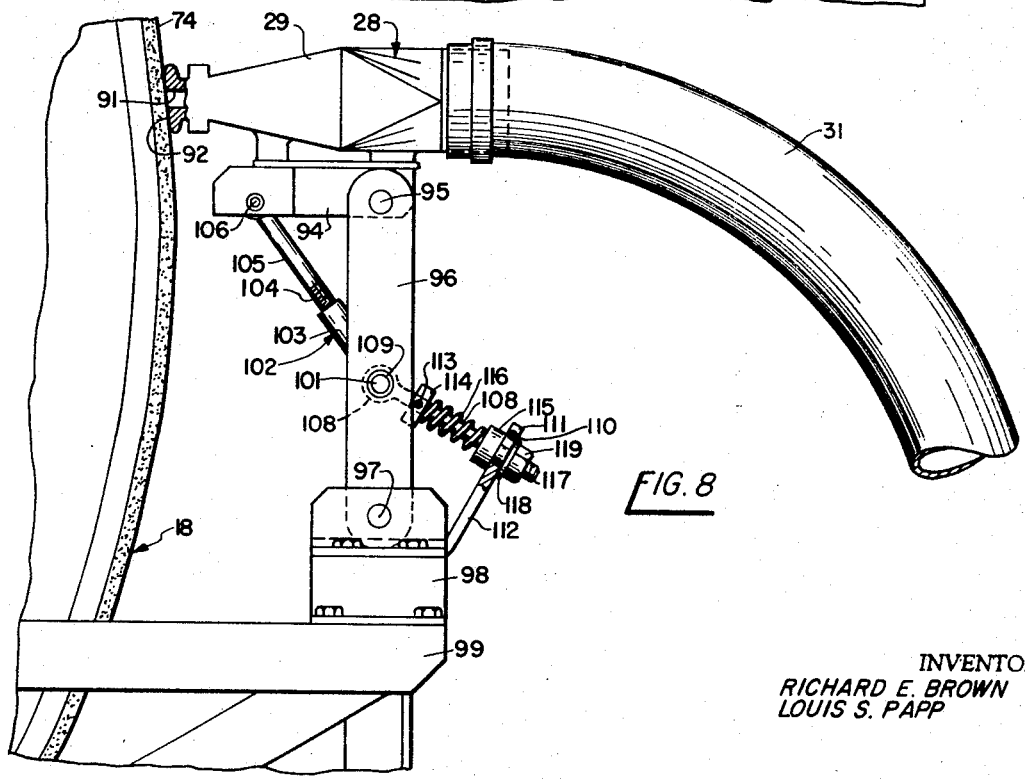
INVENTOR
RICHARD E. BROWN
LOUIS S. PAPP
BY Strauch, Nolan, Neale, Nies & Kurz
ATTORNEYS United States Patent Office 3,472,002
Patented Oct. 14, 1969

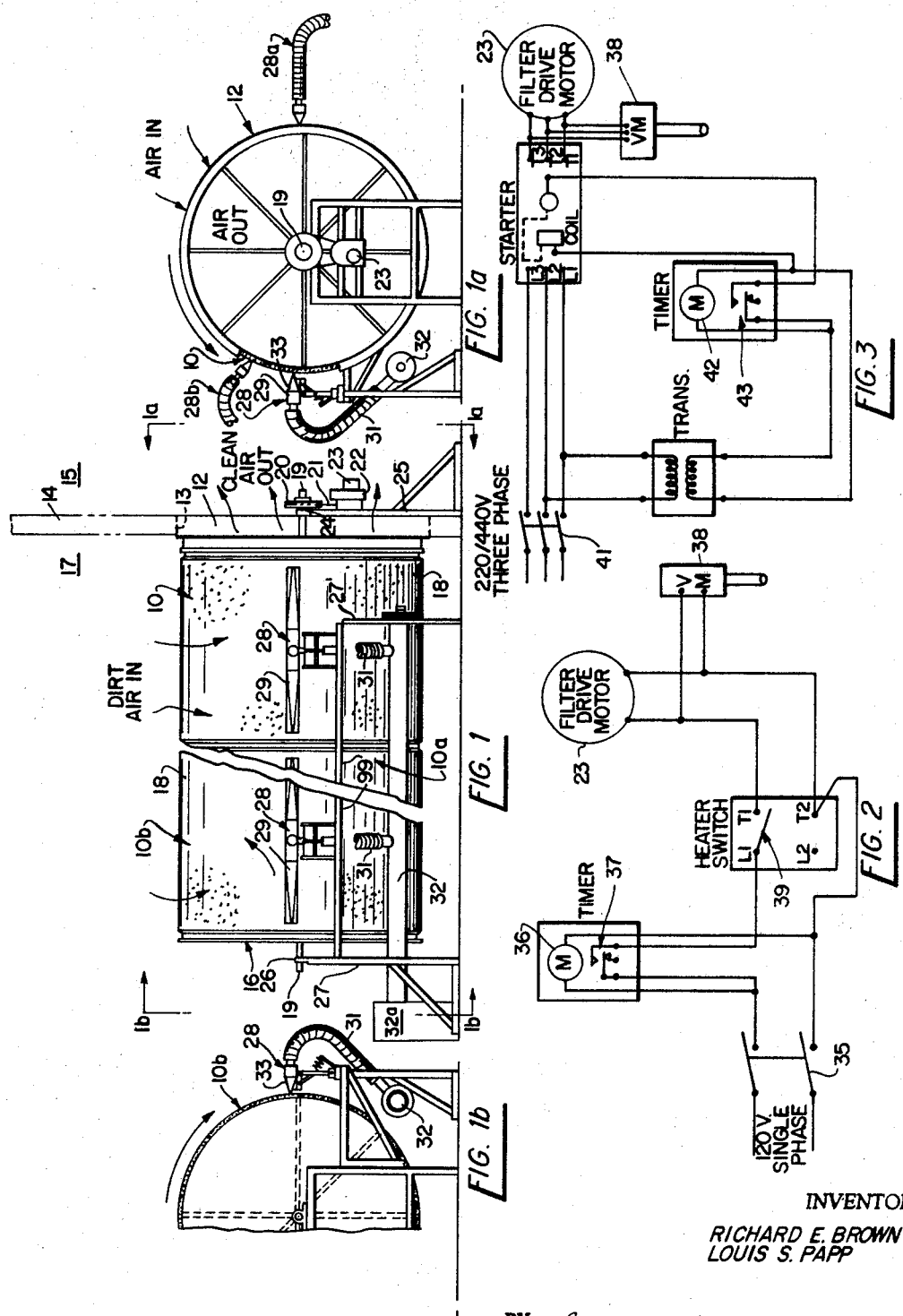

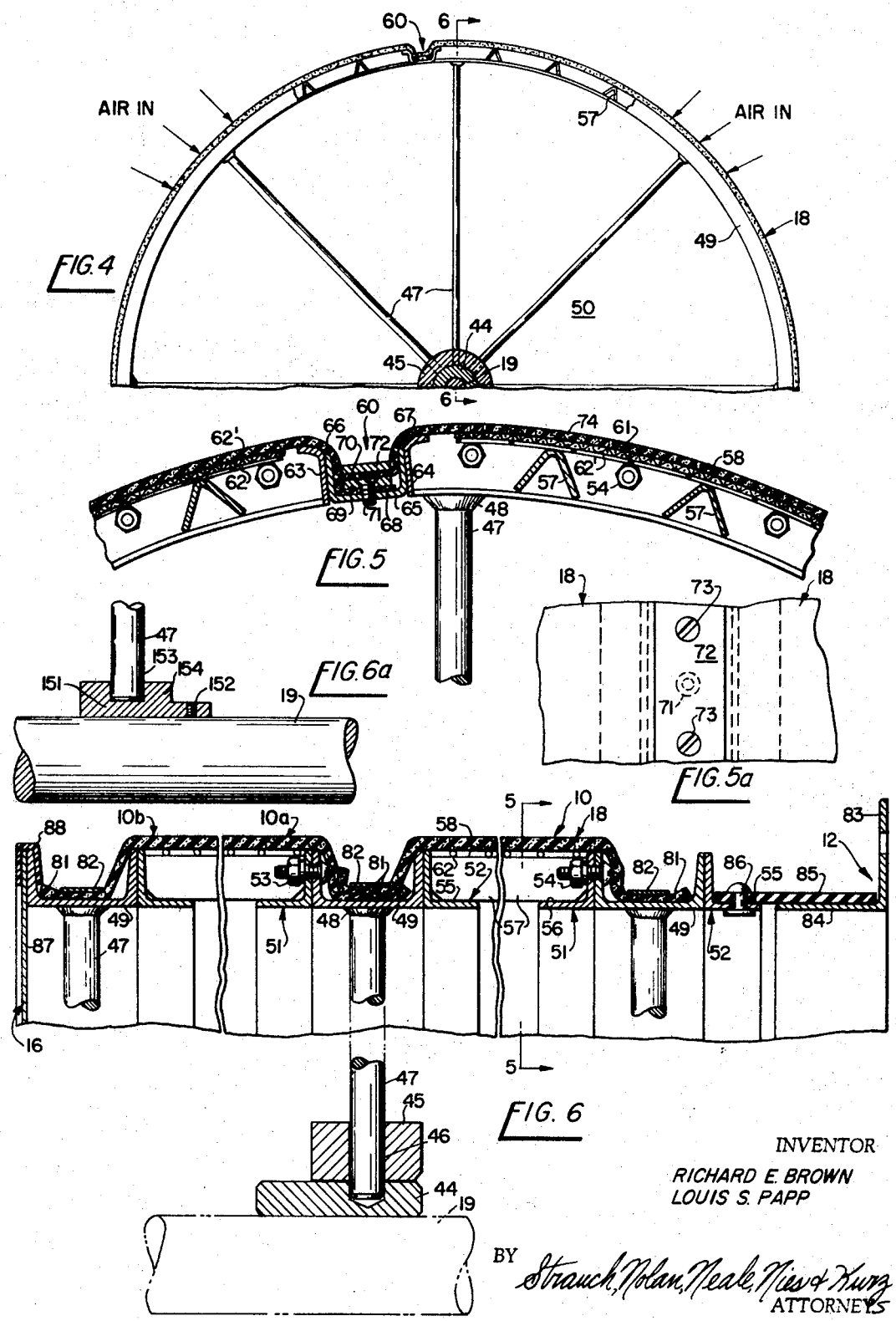

3,472,002
SELF-CLEANING DRUM TYPE FILTER ASSEMBLY
Richard E. Brown, Lyndhurst, and Louis S. Papp, Chagrin Falls, Ohio, assignors to North American Rockwell Corporation, a corporation of Delaware
Filed Feb. 9, 1967, Ser. No. 614,875
Int. Cl. B01d 33/06, 41/00
U.S. Cl. 55—272                                                    7 Claims

ABSTRACT OF THE DISCLOSURE

A rotatable self-cleaning drum type filter assembly, which may consist of one filter drum or a plurality of filter drums in series, comprises a rotor having a porous filter sheet wrapped around it and an axially fixed hollow suction cleaning head extending the effective length of the rotating drum and bearing against the filter sheet. The head is adjustable for positional contact with the drum, and resiliently biased into sealing contact with the drum surface. Each cleaning head is mounted to swing away from the associated drum for filter sheet repair or replacement.

BACKGROUND OF INVENTION

Field of invention

The invention refers to gas cleaning devices in general and more specifically to a rotating drum type, self-cleaning filter assembly wherein a hollow drum structure is peripherally covered with a filter media layer to allow air or a like gas to be cleaned to pass through the filter media into the drum and travel axially therein to exit as clean air at one end of the drum, the filtered material extracted from the air being deposited on the media and automatically removed therefrom by special cleaning units. In the invention novel means is provided to continuously clean the rotating filter media surface so as to maintain its efficiency at the designed rate of pressure drop without the necessity of having to periodically replace the filter media or washing the media.

Description of the prior art

It is known in rotating drum type filter installations to provide suction cleaning means along the drum periphery to remove contaminations from the filter media and keep the filter media clean. However, in the known prior devices, the suction head or vacuum nozzle is relatively small and is required to be repeatedly traversed along the length of the drum, thus cleaning one successive circumferential strip of filter media surface area after another. This procedure results in non-uniform cleaning of the filter area, and it takes considerable time to traverse the entire drum surface. Also it requires intricate indexing and drive mechanism for the traversing nozzle, which considerably complicates the installation and maintenance of the filtering apparatus, and adds to expense. Another disadvantage of such prior traversing nozzle arrangements was that the vacuum nozzles were usually rigidly mounted on shiftable traversing carriages with no compensation for out of round conditions of the drum or variations in the thickness of the filter media, thus sometimes causing the nozzle to either leave or scrape and damage the filter media surface.

SUMMARY OF THE INVENTION

The invention provides means to eliminate the foregoing disadvantages of the prior art and on the whole improve the performance and operating quality of a drum type self-cleaning air filter, chiefly by the provision of an axially stationary vacuum nozzle or like cleaning unit adapted to extend along and clean the entire length of the filter media on the drum during each revolution. In the invention, the vacuum nozzle is preferably pivotally mounted and adjustable to compensate for out of roundness of the drum and variations of thickness in the filter media to obtain continual contact with the filter media at all points circumferentially of the drum. The nozzle is resiliently biased against the drum surface in all conditions of such positional adjustment. Also in the invention the filter sheet may be secured on the drum by more reliable permanent fastening means than can be used in installations where the filter sheet must be periodically removed for washing and cleaning.

Accordingly, the main object of the present invention resides in the provision of an improved vacuum cleaning arrangement in a drum type air filter in which a vacuum head is axially fixed during drum rotation while being urged against the drum surface.

A further object of the invention is to provide an adjustable pivot arrangement for the vacuum head to keep the mouth of the head nozzle in continuous operational contact with the filter media at a given pressure without scraping or otherwise damaging the filter media.

A further object of the invention is an improved vacuum nozzle and nozzle supporting arrangement in a drum type self-cleaning air filter which is constructed such that the entire effective filtering surface of the drum will be suction cleaned during each drum rotation. The nozzle is adjustable to determine its position and its pressure against the drum.

A further object of the invention is to provide a novel filter drum array having for each drum a relatively stationary suction head.

Other objects and novel features will become apparent from the detailed description of the preferred embodiment in connection with the appended drawings and the claims.

BRIEF DESCRIPTION OF DRAWINGS

FIGURE 1 is a side elevation showing a drum type filter installation according to a preferred embodiment of the invention;

FIGURE 1a is an end view taken substantially on line 1a–1a at the clean air outlet end of the filter installation of FIGURE 1;

FIGURE 1b is a partial end view showing the opposite closed end of the drum filter installation substantially as viewed on line 1b–1b in FIGURE 1;

FIGURES 2 and 3 are schematic diagrams of representative electrical timer circuits which may be used with the filter installation of FIGURE 1;

FIGURE 4 is an enlarged partial end view partly broken away and in section showing the upper half of the filter drum;

FIGURE 5 is an enlarged fragmentary end view in section at the upper portion of the filter drum showing attachment of the filter media ends to each other and the drum to provide an effectively continuous filter band around the drum;

FIGURE 5a is a fragmentary plan view showing the media fastening means of FIGURE 5;

FIGURE 6 is a fragmentary side view mainly in section through the upper portion of the filter drum substantially on line 6—6 of FIGURE 4.

FIGURE 6a is a fragmentary end view mainly in section showing an alternate arrangement of securing the drum spokes to the central drum shaft;

FIGURE 7 is an enlarged partial front side view of the filter drum showing details of the vacuum nozzle structure and support;

FIGURE 8 is an enlarged fragmentary end view showing the nozzle arrangement looking substantially along line 8—8 of FIGURE 7;

PREFERRED EMBODIMENTS

Figure 9:
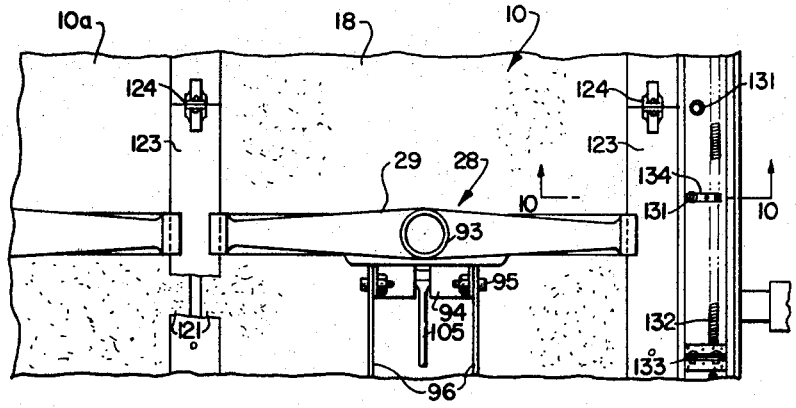
FIGURE 9 is a fragmentary front view similar to FIGURE 7 but showing an alternate filter media mounting construction.

Referring to FIGURES 1 and 4–8, the installation comprises a plurality of similar drum filter units 10, 10a and 10b arranged end to end in series. While three such units are shown one or any number may be provided according to the capacity of the installation. Also, as will appear, most features of the invention are applicable to installation wherein the drum filter units are not in series but wherein one or more of them may be independently located and operated.

In the series installation of FIGURE 1, unit 10 is open at both ends and has its right hand air outlet end connected to a suitable air baffle or direction control unit 12 suitably mounted in an opening 13 in a wall 14 of a room 15 to which clean air is to be supplied by the installation. Unit 10a is likewise open ended and preferably mounted end to end with units 10 and 10b. Unit 10b is open at the end adjacent unit 10a but is closed at its outer end indicated at 16 in FIGURE 1. Preferably the small annular spaces between the successive drums are peripherally sealed air tight.

Air to be cleaned is suitably drawn into the drum filter units from the external space 17 passing transversely through the annular peripheral filter element 18 of each drum unit into the drum unit interiors and then substantially axially through the installation and control unit 12 which may include a power driven fan providing the necessary air movement. The closed end 16 insures that all air drawn into the installation will exit through control unit 12.

A common horizontal shaft 19 extends coaxially through all of the drum filter units. All of the drum filter units rotate with shaft 19. At one end, shaft 19 carries a sprocket 20 connected by a drive chain 21 to a speed reduction unit 22 driven by electric motor 23. A shaft end bearing 24 and motor 23 are mounted on a suitable stationary support 25. The other end of shaft 19 is mounted in a bearing 26 on a stationary support 27.

Suitable controls (FIGURES 2 and 3) are provided for actuating filter drive motor 23 either continuously or intermittently for selected periods as will appear.

Each filter element 18 presents a substantially cylindrical external surface to the incoming air, and this surface tends to collect and become clogged with dirt, lint and like air contaminants. Individual cleaning units indicated at 28 are provided at the external surface of each drum filter unit.

Each cleaning unit 28 comprises a longitudinally extending relatively stationary suction head 29 having a length about equal to the axial length of the associated drum filtering surface, and each head 29 is connected by a flexible conduit 31 to a common manifold 32 which leads to a source of suction 32a.

Each suction head nozzle 33 has its long narrow inlet opening parallel to the axis of shaft 19 and lightly pressed against the relatively rotating filter surface just above the horizontal diameter thereof, so as to provide a combined scraping and suction action. The length of each suction inlet opening is preferably at least equal to the axial length of the active filter surface it engages, so that in any installation regardless of the number of drum units all of the filtering surfaces are cleaned.

In many installations, the filter drive motor 23 and a motorized suction source connected to manifold 32 are energized by a suitable manual switch control and run continuously for the working day or other period. In some installations intermittent action is provided for as shown in FIGURES 2 and 3.

In the FIGURE 2 control circuit, a 120 volt line is connected by manual switch 35 to drive a timer motor 36 which periodically closes switch 37 to actuate the filter drive motor 23 and the suction source motor at 38. The line at the outgoing side of the timer switch may contain a heater switch 39 that automatically closes in response to a suitable thermostat located in room 15, but this switch may be omitted.

The control circuit of FIGURE 3 operates from a three phase circuit through manual switch 41 which when closed actuates timer motor 42 to periodically close switch 43 and actuate filter drive motor 23 and suction drive motor 38.

In any instance, whether the filter is driven continuously or intermittently, the cleaning action of units 28 is sufficient to maintain a desired air velocity and pressure drop through the drum filter array.

A longitudinally spaced series of collars 44 are non-rotatably secured upon shaft 19 (FIGURE 6). Each collar has fixed on it an annular hub 45. The hub and collar assemblies are each formed with a series of equally circumferentially spaced bores 46 into which extend equal length spokes 47. Spokes 47 are suitably fixed at their inner ends to the hub, and their outer ends are fixed as by welding at 48 to the inner periphery of an annular channel member 49. Thus, at each end of each drum unit 10, 10a and 10b, there is a spoked support rigid with shaft 19 and comprising a hub, a set of spokes and a rim in the form of channel 49.

Angle irons 51 and 52 are secured rigidly to opposite sides of each rim channel 49 as by bolt assemblies 53 and 54. In each drum unit these angles provide longitudinally aligned annular shoulders 55 and 56 upon which are secured as by welding the opposite ends of a series of circumferentially spaced longitudinal bars 57. The opposite ends of bars 57 abut the flat parallel radial legs of the angle irons to limit the drum length. Bars 51 cooperate with the spoked end supports to form a caged rotor 50. Advantageously each bar 57 may have an inverted V-shape formed by bending a sheet of metal about a longitudinal axis, and mounting it in the assembly so that the sharp edges face inwardly and the smooth curved outer sections 58 are outwardly disposed to lie in a cylindrical envelope.

As shown in FIGURE 5, filter element 18 may consist of a single normally flat sheet 61 of filtering material such as cellular open pore polyurethane internally reinforced by a fabric backing sheet 62′ suitably bonded thereto and a stiffer screen grid 62 of metal wire. The filter element 18 is wrapped circumferentially around the rotor 50 with grid 62 resting on bars 57. An outwardly open channel assembly 60 extends longitudinally of filter element 18 and consists of longitudinal L-bars 63 and 64 having welded thereto an outwardly open channel member 65. Bars 63 and 64 have their opposite ends secured as by welding upon shoulders 55 and 56, and the channel assembly has opposed smooth arcuate shoulders 66 and 67 over which extend the opposite edges of sheet 61. Within the channel assembly, one end 68 of the sheet 61 which extends beyond the reinforcing grid is clamped between the bottom of channel element 65 and a rigid strap 69, as by screws 71 having countersunk heads so as not to project above the outer periphery of the strap. The other end 70 of sheet 61 which also extends beyond the reinforcing grid is trapped between strap 69 and an outer strap 72, secured to strap 69 as by screws 73 shown in FIGURE 5a. Thus each rotor is surrounded by a flexible filter material element 18 which is drawn essentially into a tight cylinder therearound and has its ends recessed below the outer cylinder surface 74 within the channel assembly 60 which is made as narrow as possible for least interruption of the surface. Shoulders 66 and 67 provide for smooth turning of the filter material into the channel assembly and prevent it from tearing.

Referring to FIGURE 6, at each end of a drum unit each annular end section 81 of the filter sheet 61 projects beyond the grid 62 into the outwardly open rim channel 49. At the right end of drum unit 10, the filter end section 81 is clamped to the bottom of the channel as by an overlying annular strap 82 and, where two adjacent drum units such as 10 and 10a have a common spoked end support as shown in FIGURE 6, the filter end sections 81 are overlapped under strap 82. Any suitable tightening means may be supplied for drawing straps 82 tight circumferentially.

It will be noted that axially grid 62 extends the length of underlying bars 57 so that all of the effective filtering area of each element 18 is reinforced by the grid.

At the end of the installation where drum 10 is secured to control unit 12, the latter preferably comprises an annular plate 83 adapted to be affixed to wall 14 and a tubular section 84 projecting into longitudinal alignment with the adjacent spoked support shoulder 55. The space between the right end of drum 10 and control unit 12 is sealed air tight by a surrounding resilient rubber or plastic sleeve 85 telescoped over shoulder 55 and tube 84 and secured to one of them as by rivets 86.

At the other end of the installation, closure at 16 is effected by an imperforate metal plate 87 secured to rim channel 49, as by an internally channeled annular resilient member 88 which extends peripherally over plate 87 and the outer leg of channel 49 and contracts to form an air tight seal between them.

The cleaning unit 28 individual to each drum filter unit is illustrated in more detail in FIGURES 7–9. The suction head or nozzle 29 which may be fabricated from sheet metal or molded from a suitable plastic is shown in FIGURE 7 as applied to the drum filter unit 10a, and as shown in FIGURE 8 a narrow opening 91 that extends from end to end of nozzle 29 parallel to the axis of the drum filter unit is provided in the front face 92 of the nozzle which as will appear is biased to bear lightly on the drum surface 74. The nozzle is hollow and at its rear end is a tubular boss 93 connected to flexible conduit 31.

Nozzle 29 is fixedly mounted on a bracket 94 which is rearwardly pivoted at 95 between similar parallel upright links 96 that in turn are pivoted at 97 upon lugs 98 on relatively stationary base 99 which may for example be a beam connected between supports 27 and 27' for stability of the installation. A pivot arbor 101 extends between links 96 and the bifurcated end of a yoke 102 is pivoted on arbor 101. The leg 103 of the yoke is threaded to receive the threaded end 104 of a rod 105 that is pivoted at its upper end at 106 on bracket 94. By turning rod 105 within the yoke, the effective distance between pivots 101 and 106 is altered to swing bracket 94 about pivot 95 and thereby vertically adjust the position of nozzle 29 relative to drum filter surface 74. The purpose of this adjustment is to set the face 92 of nozzle 29 in optimum smooth full contact with surface 74 for maximum cleaning efficiency.

An eye bolt 108 is pivoted at 109 on arbor 101, and extends freely through an open slot 111 in an upstanding fixed lug 112 on the base. Near pivot 101, the shank of bolt 108 has an axially fixed abutment provided by a retained 114 slidably adjustable on the bolt but fixed in a desired location by a set screw 113.

A second slidable retainer 115 is mounted on bolt 108 in abutment with lug 112 and a relatively strong spring 116 surrounding bolt 108 is compressed between the retainers. Bolt 108 beyond the slot 111 is threaded at 117 to mount a washer 118 and a nut 119. When nut 119 is turned this changes the effective distance between abutment 114 and lug 112. Adjustment of retainer 114 along bolt 108 varies the compression of spring 116 which biases nozzle 29 into contact with drum filter surface 74 and this selects the proper degree of constant operating pressure between nozzle face 92 and the drum filter surface 74 as resiliently exerted by spring 116. Adjustment of nut 119 controls the maximum distance the spring 116 can bias the nozzle 29 toward the surface of the filter media on the drum. In practice, the nut 119 will be adjusted so that the nozzle 29 will contact the filter media at all times irrespective of normal variations in media thickness or out-of-round conditions of the drum.

A retainer pin 110 normally closes the open end of slot 111 to hold the bolt end in the slot. When pin 110 is removed, bolt 108 can be swung upwardly about its pivot on arbor 101 to be free of lug 112. This enables the entire assembly 29 to be swung rearwardly about pivot 97 away from the drum surface, for cleaning of the nozzle or replacement of the filter element 18 without disturbing the preset nozzle adjustments at the yoke and bolt 108, which will become again effective as soon as the nozzle is swung back into operative position.

The invention thus provides a nozzle assembly that extends across the entire effective length of the filter drum, and is adjustably spring loaded against the filter surface sufficiently to seal the nozzle mouth 91 against a suction leak and compensate for any out of round condition or other unevenness of surface 74.

Figure 10:
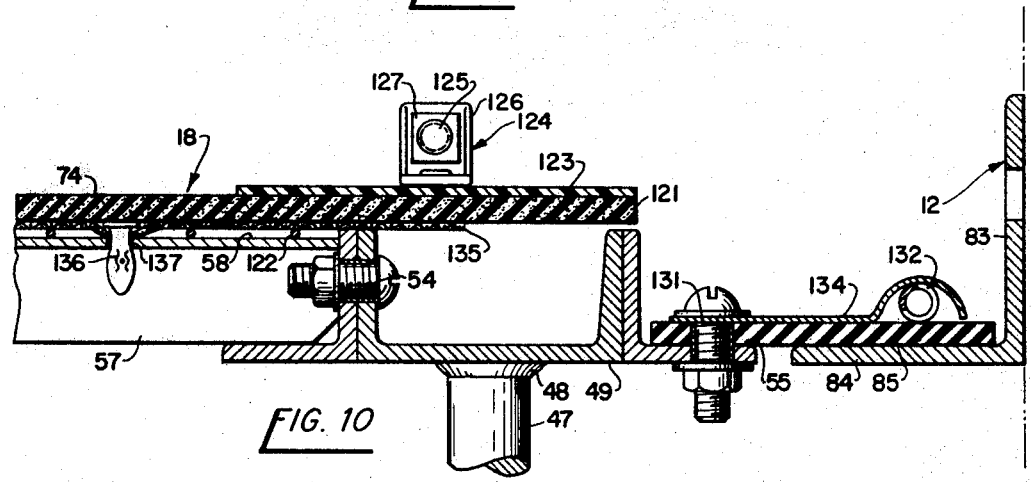
FIGURE 10 is a fragmentary end view in section substantially along line 10—10 of FIGURE 9 showing the filter mount structure.
Figure 11:
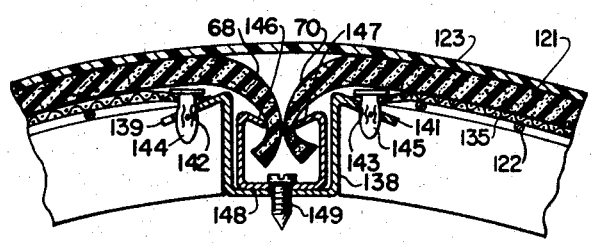
FIGURE 11 is a fragmentary view in section similar to FIGURE 5 but illustrating another filter media end fastening structure.

FIGURES 9–11 illustrate modifications which are of current commercial value. As shown in FIGURE 10, the annular filter material end sections, here indicated at 121 and extending beyond the reinforcing grid 122, are not secured within the rim channels 49 but extend over the open outer ends of the channel. The filter element is there surrounded by a relatively thin smooth flexible band 123 of nylon or other hard plastic that has its opposite ends connected by a suitable clamp 124 (FIGURE 9) such as a threaded screw 125 passing through apertured lugs 126 fixed to the band ends and mounting a nut 127 which when drawn tight snugly tightens band 123 over the filter material ends. At the junctures between successive drum filters in this embodiment, band 123 bridges over the adjacent ends 121 of the filter material. The channels 49 internally back up the flexible filter material at bands 123 to limit distortion of the material as the bands are tightened.

Bands 123 are preferably quite thin so that they do not interfere with effective nozzle engagement at surface 74. On the other hand the bands provide smooth slide glide surfaces underlying the opposite ends of each nozzle 29 so that during drum rotation this eliminates any tendency of the relatively soft filter material from bunching up or gathering in wrinkles ahead of the stationary nozzle, this being especially advantageous where the nozzle is improperly adjusted with respect to the drum surface. Also the bands prevent indentation of the nozzle passing over the fastening region at 60.

As shown in FIGURE 10, the polyurethane foam sheet which may have a fabric layer bonded on its undersurface as in FIGURE 5, overlies a layer of woven metal wire 135 attached to the drum by the heads of a series of snap fasteners 136 having their shanks projecting through apertures 137 in bars 57.

FIGURE 10 shows the sealing sleeve 85 as removably secured onto the rim end shoulder 55 as by a series of bolt assemblies 131. An annular garter type coil tension spring 132 surrounds sleeve 85 to hold it in tight sealing contact with tube 84. As shown in FIGURE 9, the opposite ends of spring 132 are attached to a suitable adjustable clamp bracket 133 which determines spring tension. A series of spring retainer clips 134 extend from at least some of the bolts 131 to axially retain spring 132.

FIGURE 11 illustrates another mode of mounting the filter element circumferentially on the rotor cage, which may be used instead of that shown in FIGURE 5. Here one of the bars 57 is in the form of an outwardly open channel 138 having oppositely extending side flanges 139 and 141 containing apertures 142 and 143 to receive snap fasteners 144 and 145 having their heads attached to hold the ends of a layer of woven wire mesh 135. It will be noted that both flanges are bent angularly somewhat inwardly of the drum.

The end edge regions 68 and 70 of the filter material 121 which may be the laminated sheet 62, 62' of FIGURE 5 are turned inwardly of the drum to be gripped and held by the inwardly bent tangs 146 and 147 of a smaller channel 148 that is secured within channel bar 138 as by screws 149. As shown in FIGURE 11, bands 123 also bridge this fastening area, so that there is no unevenness of contact between the nozzle and drum surface. The filter element is circumferentially stretched tight with its ends thrust into channel 148 and the tangs bent to grip the filter material ends between them.

The foregoing fastening arrangements prevent displacement of the filter media around the drum.

FIGURE 6a shows another mode of mounting each spoked support on the shaft 19. A collar 151 is secured on shaft 19 as by set screw 152, and an integral hub portion 154 is formed with the sleeve with a series of bores 153 within which the spokes 47 are press fitted.

In operation, the filter drum assembly may be rotated continuously by driving motor 23 to rotate shaft 19 so as to rotatably move surface 74 at about 10 feet per minute, or intermittently at that speed as conditions warrant. Likewise, vacuum cleaning may be continuously or periodically applied during drum rotation. The velocity of suction air through nozzle 29 is preferably approximately at 4000 feet per minute to keep the nozzle and suction manifold system clean and to transport the collected contaminants through flexible tubes 31 and manifold 32 to a collection station (not shown) which may comprise an easily accessible and removable bag type filter.

Thus, the invention provides for the first time a drum type filter and associated vacuum nozzle arrangement which eliminates the need for complex nozzle traversing mechanisms to clean the full width of the filter drum, which nozzle is adjustably spring loaded against the filter media of the drum to assure optimum nozzle contact with the filter media under any out of round condition for maximum efficiency.

In some embodiments of the invention, it is advantageous to provide another axially fixed cleaning nozzle unit 28a engaging the other side of each durm about 180° displaced from the unit 28, or optionally another axially fixed cleaning nozzle unit 28b engaging the drum surface just ahead of each unit 28. These units 28a and 28b are indicated in FIGURE 1, it being understood that their structure and connections to a manifold are the same as for unit 28.

These further nozzle units are advantageous for supplementary cleaning action (28a) or preliminary rough cleaning (28b) usually only where conditions of extreme lint and heavy dust, or where special refinement of air cleaning is desired. Normally a single array of cleaning units is adequate.

What is claimed and desired to be secured by Letters Patent is:

1. A self-cleaning drum type filter assembly for removing extraneous matter from air and other gaseous fluids, said filter assembly comprising a cylindrical perforated drum having mounted thereon a peripheral annular layer of porous filter media, means causing the fluid to be filtered to pass from the exterior of said drum through the filter media into the interior thereof and out from at least one end of the drum, means supporting said cylindrical drum for rotation about its longitudinal axis, drive means operatively connected to said cylindrical drum to rotate said cylindrical drum about its longitudinal axis, a hollow suction nozzle having a narrow width and being connected to a suction source, said nozzle having a continuous area face portion surrounding an elongated mouth opening of a length substantially identical to the longitudinal length of said peripheral annular layer of filter media, and means mounting said suction nozzle with said face in engagement with the exterior surface of said peripheral layer comprising a stationary frame, a support link pivoted on said frame on an axis parallel to the drum axis, means pivotally mounting said suction nozzle on said support link on another axis parallel to the drum axis, means for movably adjusting said suction nozzle about its pivot on said support link to vary the position of said suction nozzle face with respect to said peripheral annular layer engaged thereby for obtaining optimum surface contact of said face and said peripheral annular layer all around said mouth opening, means resiliently biasing said support link to urge said suction nozzle face against said peripheral annular layer, and means for adjusting the bias with which said resilient means urges said suction nozzle face against said peripheral annular layer.

2. A self-cleaning filter assembly as defined by claim 1 said biasing means including means for selectively releasing said support link to permit said support link and suction nozzle to be pivotally moved to a position remote from said peripheral layer to provide access to said peripheral layer.

3. A self-cleaning filter assembly as defined by claim 1 in which said peripheral layer of porous filter media is a flexible sheet wrapped around said cylindrical drum, said filter assembly further comprising substantially continuous thin anular bands of relatively hard smooth material surrounding the axial ends of said sheet to maintain said sheet in position, the axially opposite ends of said face portion engaging said bands and riding thereon when said cylindrical drum is rotated and said elongated mouth opening extending between said bands in contact with said sheet to clean said sheet as said drum is rotated.

4. A self-cleaning filter assembly as defined by claim 1 further including means for controlling said drive means for selectively rotating said cylindrical drum in accordance with a predetermined schedule.

5. A self-cleaning filter assembly as defined by claim 4 in which said control means includes timing means for intermittently rotating said cylindrical drum for predetermined periods of time.

6. A self-cleaning filter assembly as defined by claim 1 further including at least one additional substantially identical suction nozzle in angularly displaced relation to said first named suction nozzle.

7. A self-cleaning drum type filter assembly as defined in claim 1 comprising a plurality of cylindrical drums in end to end array, each of said drums having mounted thereon a peripheral layer of porous filter media, means closing one end of said array and providing an outlet at the other end of said array, said supporting means supporting said array for rotation about its longitudinal axis, said drive means operatively connected to said array to rotate said array about its longitudinal axis, a plurality of hollow suction nozzles having identical construction as said hollow suction nozzle, each of said nozzles associated with a respective one of said cylindrical drums, and a plurality of said mounting means each supporting a respective one of said suction nozzles with its mouth opening in engagement with said peripheral layer.

References Cited

UNITED STATES PATENTS

| 1,564,451 | 12/1925 | Schroeder | 210—400 |
| 1,945,491 | 1/1934 | Lamort | 210—393 |
| 2,332,917 | 10/1943 | Jordan et al. | 210—393 |
| 2,395,499 | 2/1946 | Oliver et al. | 210—393 |
| 2,406,931 | 9/1946 | Troxler | 55—294 |
| 2,534,161 | 12/1950 | Collins | 210—402 |
| 2,678,109 | 5/1954 | Vedder | 55—294 |
| 2,875,846 | 3/1959 | Yonkers | 55—290 |
| 3,083,515 | 4/1963 | Morris et al. | 55—290 |
| 3,107,987 | 10/1963 | Duer | 55—404 |

(Other references on following page)

UNITED STATES PATENTS

| | | | |
|---|---|---|---|
| 3,251,175 | 5/1966 | Black | 55—294 |
| 3,306,012 | 2/1967 | Wallin | 55—294 |
| 3,308,610 | 3/1967 | Springer et al. | 55—522 |
| 3,315,446 | 4/1967 | King | 55—294 |
| 3,334,749 | 8/1967 | Ladd | 210—393 |
| 3,345,805 | 10/1967 | Sherrill | 55—290 |
| 3,360,907 | 1/1968 | Clark et al. | 55—293 |
| 3,315,320 | 4/1967 | Bass et al. | 19—107 |
| 1,196,438 | 8/1916 | Doyle et al. | 15—306.1 |
| 1,649,220 | 11/1927 | Goodloe | 55—290 |
| 2,169,435 | 8/1939 | Simpson | 55—290 |
| 2,840,861 | 7/1958 | Hewitt et al. | 15—306 |

FOREIGN PATENTS

| | | |
|---|---|---|
| 998,146 | 7/1965 | Canada. |
| 789,323 | 1/1958 | Great Britain. |

HARRY B. THORNTON, Primary Examiner

B. NOZICK, Assistant Examiner

U.S. Cl. X.R.

55—290, 294, 302, 501; 210—393, 402